Nov. 30, 1965     K. B. CLARK     3,220,107
MANUFACTURE OF CLAD RODS, TUBING AND CLAD TUBING
Filed March 6, 1961     4 Sheets-Sheet 2
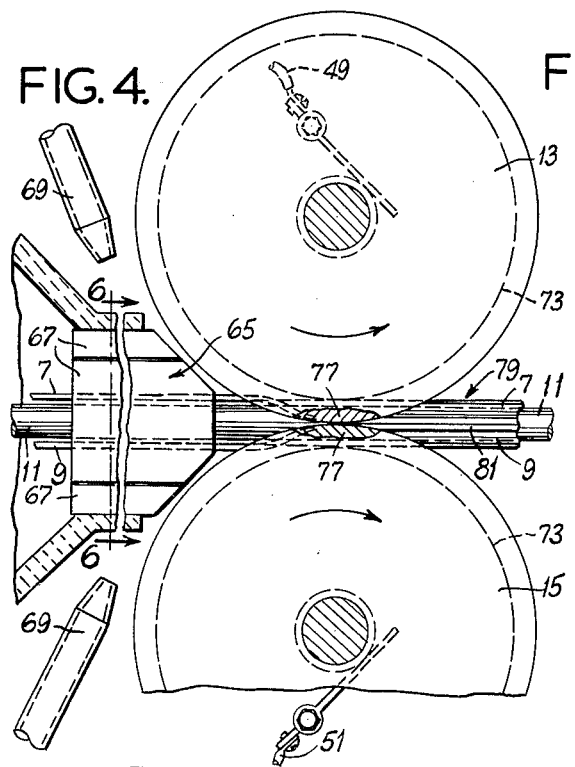
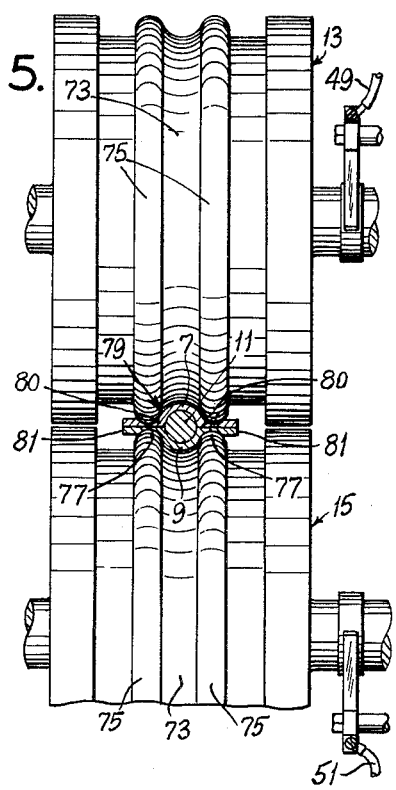
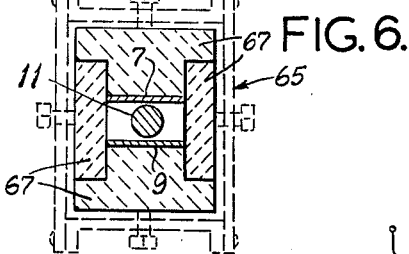
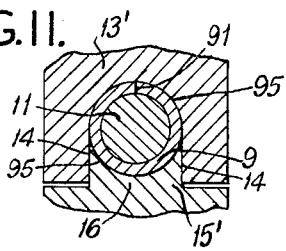
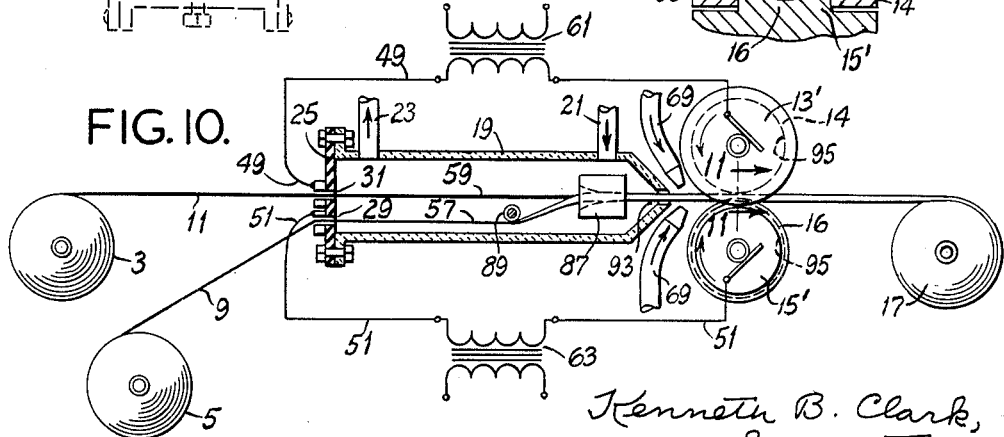
Kenneth B. Clark,
Inventor.
Koenig and Pope,
Attorneys.

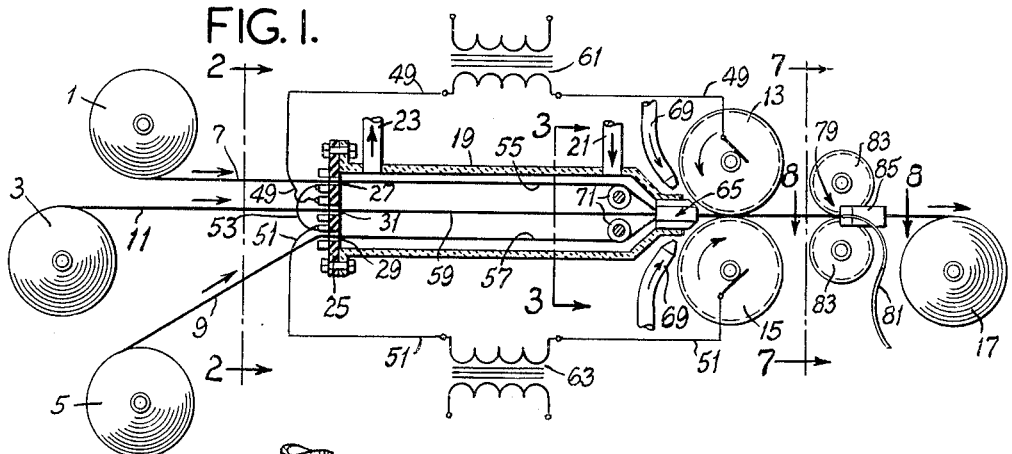

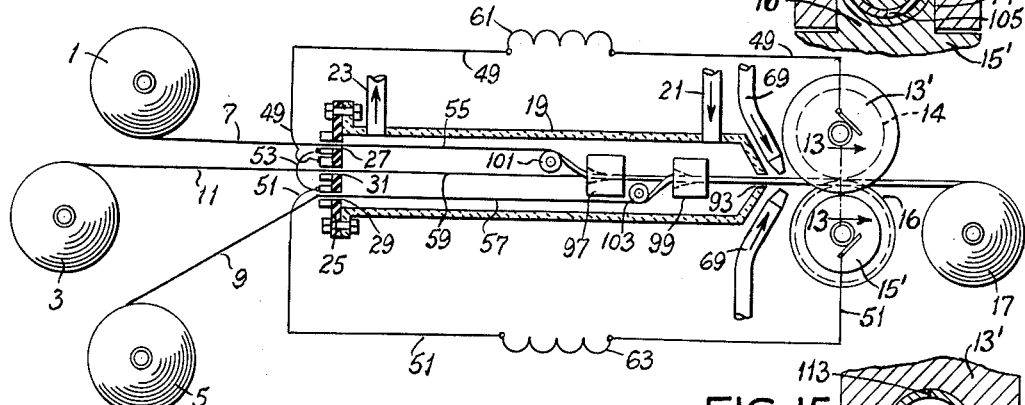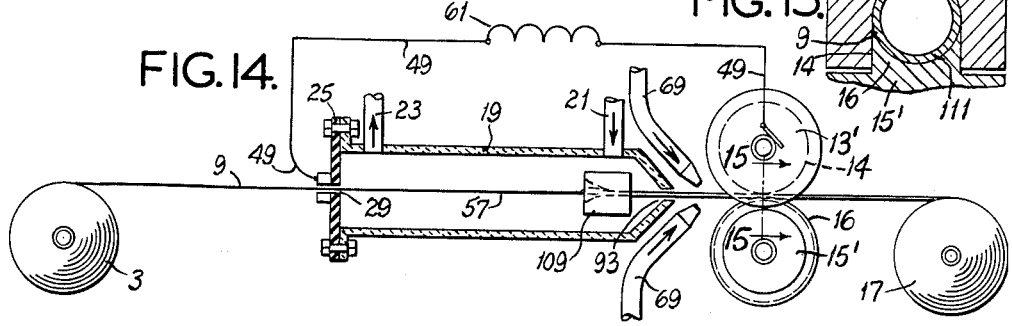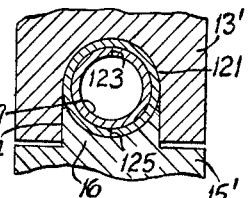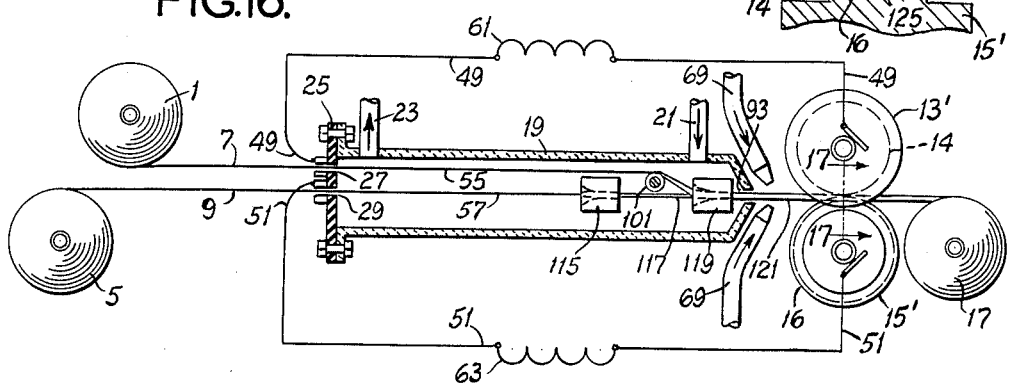

Nov. 30, 1965 K. B. CLARK 3,220,107
MANUFACTURE OF CLAD RODS, TUBING AND CLAD TUBING
Filed March 6, 1961 4 Sheets-Sheet 4

Kenneth B. Clark,
Inventor.
Koenig and Pope,
Attorneys

United States Patent Office 3,220,107
Patented Nov. 30, 1965

3,220,107
MANUFACTURE OF CLAD RODS, TUBING AND
CLAD TUBING
Kenneth B. Clark, Spragueville, R.I., assignor to Texas Instruments Incorporated, Dallas, Tex., a corporation of Delaware
Filed Mar. 6, 1961, Ser. No. 93,513
1 Claim. (Cl. 29—474.1)

This invention relates to the manufacture of clad rods, clad tubing and tubing per se, and with regard to certain more specific features, to a temperature-controlled solid-phase bonding process for such manufacture. It comprises improvements upon the subject of my United States Patent application Serial No. 63,678, filed October 19, 1960, entitled Forming and Solid-Phase Bonding.

Among the several objects of the invention may be noted the provision of a process for the manufacture of single- or multi-clad rods, wires, tubes and the like, and for the manufacture of single-ply and multi-ply tubes per se, in which the product is improvedly solid-phase bonded; the provision of a process of the class described which by employing a heating step for solid-phase bonding permits of the use of smaller reductions under pressure for bonding and cylinder formation while at the same time producing a superior product; the provision of a process of the class described in which said heating step is of the differential temperature type permitting improved bonding and cladding of materials having different working properties as, for example, comparatively hard and soft properties or comparatively brittle and ductile properties, examples of brittle materials being graphite or molybdenum; and the provision of a process of the class described which may be economically and rapidly performed with high accuracy of the product. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claim.

In the accompanying drawings, in which several of various possible embodiments of the invention are illustrated, FIG. 1 is a diagrammatic view illustrating apparatus for carrying out one form of the invention in which two strips are employed for cladding a wire;

FIG. 2 is an enlarged cross section taken on line 2—2 of FIG. 1;

FIG. 3 is an enlarged cross section taken on line 3—3 of FIG. 1;

FIG. 4 is an enlarged detailed view of parts of FIG. 1, illustrating operating features at certain mill rolls;

FIG. 5 is a right side view of FIG. 4;

FIG. 6 is a cross section taken on line 6—6 of FIG. 4;

FIG. 7 is an enlarged cross section taken on line 7—7 of FIG. 1;

FIG. 8 is an enlarged horizontal section taken on line 8—8 of FIGS. 1 and 7;

FIG. 9 is a cross section taken on line 9—9 of FIG. 8;

FIG. 10 is a view similar to FIG. 1, illustrating a second form of the invention;

FIG. 11 is an enlarged cross section taken on line 11—11 of FIG. 10;

FIG. 12 is a view similar to FIG. 1, illustrating a third form of the invention;

FIG. 13 is an enlarged cross section taken on line 13—13 of FIG. 12;

FIG. 14 is a view similar to FIG. 1, showing a fourth form of the invention;

FIG. 15 is an enlarged cross section taken on line 15—15 of FIG. 14;

FIG. 16 is a view similar to FIG. 1, showing a fifth form of the invention;

FIG. 17 is an enlarged cross section taken on line 17—17 of FIG. 16;

Corresponding reference characters indicate corresponding parts throughout the several views of the drawings.

Figure 18:
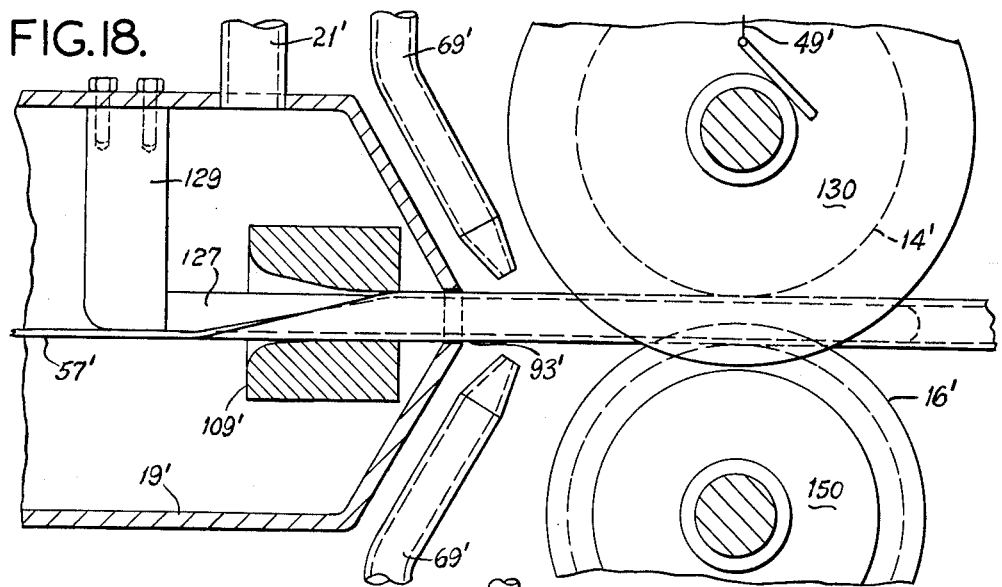
FIG. 18 is a fragmentary cross section illustrating a modification of the form of the invention shown in FIGS. 14 and 15.

The term metals as used herein in its broad sense means metals and alloys. The terms wire and rod are to be taken as equivalents. The term seamed cylindrical material means hollow seamed tubes, whether clad or not, and also infilled seamed tubes constituting clad wire, clad rods and the like wherein the core or cladding material may be nonmetallic, such as graphite or carbon. The term material comprehends metals and nonmetals such as above-mentioned and dielectrics such as nylon, polyethylene, tetrafluoroethylene polymer or the like. The term reduction means a reduction in cross section brought about by squeezing pressure. In the following description, references to conventional wire and strip guides, circuit controls, and the like are omitted for clarity in description.

Referring now more particularly to FIG. 1, there is shown at numerals 1, 3 and 5 pay-off supply coils consisting for example of flat metal strips 7 and 9, adapted to be withdrawn from the coils 1 and 5, respectively, and for example a metal core or wire rod 11, adapted to be withdrawn from the coil 3. If the rod 11 cannot be coiled it may come from any other suitable source, and the same is true of the strips 7 and 9. In general, however, the dimensions of the materials 7, 9 and 11 are small enough for coiling.

The strips 7 ad 9 and wire 11 are drawn from the coils 1, 5 and 3 by the rolls 13 and 15 of a suitable rolling mill, from whence the resulting rolled material (to be described) is drawn onto a suitable coiler 17.

At numeral 19 is shown a retort for containing a suitable protective atmosphere which may be circulated into and out of the retort through ports 21 and 23. The atmosphere may consist of an inert or reducing gas, as required by the nature of the materials constituting lengths 7, 9 and 11. The left end of the retort 19 is closed by an electrically insulating cover or head 25, having entry openings 27, 29 and 31 for the elongate materials 7, 9 and 11, respectively. Adjacent the entires 27 and 29 are bolted fine-silver electrical contacts 33 and 35, respectively (see FIG. 2). These slidably contact the strips 7 and 9, respectively, as these strips pass into the retort 19. Contacts 35 and 33 are connected by a wire 53. Floating steel pressure plates 37 and 39, under bias of springs 41, press the strips 7 and 9 into engagement with the electrical contacts 33 and 35. Fine-silver jaw contacts 43 are pivoted at 45 to the head 25, these being notched for electrical sliding contact with the wire. The jaws are biased together by a spring pressure mechanism indicated generally at 47.

A circuit connection 49 has one terminal connected to the contacts 43 and another to the roll 13. Another circuit connection 51 has one terminal connected to the contact 35 and another to the roll 15. Thus the reach 57 of strip 9 in retort 19 closes an electric circuit through the connection 51. The reach 55 of strip 7 in retort 19 between contact 33 and roll 15 also closes an electric circuit through the connection 51 (see jumper wire 53). The reaches 55 and 57 thus form parallel connections fed by connection 51. The circuit constituted by connection 51 is excited from a transformer 63. The reach 59 of wire 11 between contacts 43 and roll 13 closes an electric circuit through connection 49. The circuit constituted by connection 49 and reach 59 is excited from a transformer 61.

In some instances a series circuit arrangement may be desired for reaches 55 and 57. This may readily be accomplished by removal of the jumper wire 53 and, instead of connecting the right side of transformer 63 to roll 15, connecting this right side to contact 33. Such a series circuit arrangement is advantageous in those cases in which strips 7 and 9 are of low electrical resistance requiring more resistance in the circuit of transformer 63 for adequate heating.

At the right-hand end of the retort 19 is an outlet structure 65, consisting of suitably mounted, interfitting ceramic blocks 67, through which the strips 7, 9 and wire 11 pass out of the retort 19. Appropriate mountings for the blocks 67 are suggested by dotted lines in FIG. 6. In order that the reaches 55 and 57 may be maintained separate from the reach 59 in the retort 19, the strips 7 and 9 are caused to pass over guide rolls 71 within the retort, just prior to passage through the blocks 67. Some of the protective atmosphere may pass out of the opening through which pass the wire and strips. Additional supplies of protective atmosphere may be projected onto the emerging strips and wire from nozzles 69 to protect them in their short passage to the rolls 13, 15.

Typical shapes of rolls 13 ad 15 are shown in FIGS. 4 and 5. These incorporate partially circular conjugate grooves 73, flanked by lands 75. These grooves and lands have the effect, when the rolls are driven in a direction shown by the arrows, to receive the strips 7 and 9, so as to form them around the wire 11 and to pinch them at points 77, all with a squeezing action. This squeezing action is such that the wire 11 and the surrounding portions of the strips 7 and 9 are reduced in cross section, including reduction at the pinches 77. The reduction in cross section is sufficient to obtain a continuous solid-phase bond such as, for example, described in United States Patent 2,753,623, assuming that bond-deterring contaminants have been removed from the strips and the wire prior to entry between the rolls 13 and 15. In this regard it is assumed that gross contaminants such as scale and the like shall have been removed from the materials 7, 9 and 11 before they enter the retort 19, any vaporizable bond-deterring films such as for example moisture, oil and the like being removed in the retort by the heating therein. Any oxide films are reduced in the retort by the heat and a suitable atmosphere therein employed for this purpose.

One purpose of the electric circuits above described is to produce sufficient controlled current through the reaches 55, 57 and 59 that vaporizable bond-deterrent film contaminants will be removed by heating at these reaches. Film contaminants here referred to are not gross contaminants, such as scale and the like, but such as would, in the absence of heating, need to be removed by wire brushing, sanding or the like. Thus the heating avoids the necessity for such wire brushing, sanding or like costly operations. Another purpose for the heating is that temperatures may be maintained in the reaches 55 and 57 of the strips which are different from the temperature maintained in the reach 59 of the wire. Thus the physical, mechanical and chemical properties of the materials used to some degree can be controlled by the differential heating, so that optimum conditions may be maintained for solid-phase bonding by reduction between the rolls 13 and 15. Thus better solid-phase bonds can be obtained with minimum reduction at low squeezing pressures. Temperature control may be effected manually through the use of suitable saturable reactors or the like, employed in connection with the transformers 61 and 63, or if desired, such apparatus may be under regulating control of thermoelectric sensors responding to strip and wire temperatures at the outlet 65. Appropriate apparatus for this purpose is not shown, being common in the art of current regulation. Examples of cases in which differential heating is useful (without limitation) are (a) cladding of soft or hard metallic or nonmetallic cladding materials on hard or soft metallic or nonmetallic core materials, respectively; (b) cladding on relatively brittle materials such as a graphite or molybdenum rod, and the like. It will be understood in this regard that within the term "differential heating" is contemplated a heating of one component only, while the other passes through the process at the ambient temperature. An example of such a case is one wherein a chemical reaction upon heating is to be avoided as with stainless steel; or where heating might bring about a liquid phase as in a plastic to be employed for an outer cladding material. In such event only the component not damageable by heating would be heated.

A typical cross section of the bonded material issuing from the rolls 13 and 15 is illustrated at 79. This consists of a cylindrical core constituted by the material of the original wire 11 to which is solid-phase bonded the material which constituted the original strips 7 and 9, with additional parallel bonded pinch stripes 80 between the strips. Outside of the stripes are marginal waste strips 81. The latter, due to pinch severing action, generally fall away as the bonded assembly leaves the rolls 13 and 15 but in some instances they may not do so. In either event, the pinch stripes, fins or flashings 80 are skived off by skiving apparatus shown in FIGS. 1, 7 and 8. If, as shown in FIGS. 4, 5, 7, 8 and 9, the waste strips have not already fallen away, they also become removed along with removal of the pinch stripes 80. This apparatus consists of a pair of grooved gripping rollers 83, flanked by skiving cutters 85. The cutters 85 skive off the material shown by dotted lines in FIG. 9, leaving a clad wire W, illustrated in FIG. 8 and by solid lines in FIG. 9. If desired, the solid-phase bond can be further improved by a subsequent heating or sintering operation. The finished wire W is finally wound onto the coiler 17, as shown in FIG. 1.

In FIGS. 10 and 11 is shown a form of the invention adapted to produce a clad wire rod having a single seam in the cladding, rather than the double-seam form illustrated in FIG. 9. In this case, like numerals designate parts like those shown in FIG. 1, further verbal description in which respect is unnecessary. The point of departure in this case is that the strip 7 is eliminated along with the opening 27 and appurtenances adjacent this opening. The reach 59 of wire and the reach 57 of the strip 9, in the retort 19, are manipulated so as to enter a funnel-shaped conventional tube drawing or curling die 87. The wire 11 enters the die coaxially. The strip 9, after being guided over a roller 89, enters the die so as to be cylindrically curled around the wire in passing through the die. The width of the strip 9 is such that after curling around wire 11 its margins abut. Such abutment is shown at 91 in FIG. 11. The arrangement is such that the abutment 91 is in a vertical plane as the material 9, 11 leaves the outlet 93 of the retort 19 and enters rolls 13′, 15′ (FIG. 10). From the outlet 93 the material passes through the rolls 13′ and 15′ to the wind-up coiler 17. In this case the grooves 95 of the rolls 13′, 15′ and adjacent parts are of the shapes shown in FIG. 11. These shapes are such that the strip material is accurately formed around the wire material 11. In addition, one roll 13′ is formed with a flat-sided groove 14. The groove in the adjacent roll 15′ is formed in a flat-sided collar 16 which interdigitates and interfits with the groove 14. Thus the elements 14 and 16 have conjugate circular forming portions and engaging flat side walls. This wall formation avoids the production of any fins or pinch stripes such as appear at 80 in the form of the invention shown in FIGS. 1–9. It is pointed out in this connection that the rolls shown in FIG. 5 could be similarly formed, in which event the pinch stripes or fins 80 would be obviated. Conversely, rolls 13 and 15 such as shown in FIG. 5, could be used in the FIG. 10 structure. Either the curled material 9 alone, or both it and the wire 11, are reduced under pressure, whereby there is formed a solid-phase bond between the materials 9 and 11 and also between the marginal contact stripe in the abutment 91.

In FIGS. 12 and 13 is shown a third form of the invention in which again like numerals designate like parts. In this case, two draw curling dies 97 and 99, with appropriate guide rolls 101 and 103, are used in the retort 19 for operating upon the reaches 55, 57 and 59 of strips 7, 9 and intermediate wire 11. These reaches are electrically heated from circuit portions 49 and 51, as above described in connection with FIG. 1. In this case the wire 11 passes coaxially through the dies 97 and 99. The reach 55 of strip 7 passes over a roller guide 101 and enters the die 97 from one side, so that its abutment 105 is downward (see FIG. 13). The reach 57 of strip 9 passes over a roller guide 103 and enters die 99 from the opposite side, so that its abutment 107 is upward. The reach 59 of wire 11 is thus enveloped by both curled strips, one over the other. Again, drawn materials thus assembled leave the outlet 93 of the retort 19, being drawn out by the rolls 13', 15'. These rolls have shapes corresponding to those shown in FIG. 13 such that the folded and assembled components are reduced by squeezing to obtain a solid-phase bond between the wire 11 and the inner folded strip 7, between the folded strips 7 and 9, and between the margins at the abutments 105 and 107. The assembled and solid-phase bonded component then proceeds to the wind-up coiler 17.

In FIGS. 14 and 15 is shown a fourth form of the invention, in which like numerals designate like parts. In this case the point of departure is in the modification of the head 25, so as to place the inlet 29 centrally, for reception of one strip 9 only for passage through the retort 19 to and through rolls 13', 15'. Heating again is accomplished by current sent through reach 57 by circuit portion 49. In this case there is provided in the retort 19 a single curling draw die 109. This curls the reach 57 of strip 9 into hollow tubular form such as shown at 111 (FIG. 15), its abutment appearing at 113. The tube passes from the exit 93 through the rolls 13', 15', in which it is squeezed sufficiently with some reduction to obtain a solid-phase bond across the abutment 113. The resulting bonded-seam, hollow tube passes to the wind-up coiler 17.

In FIGS. 16 and 17 is shown a fifth form of the invention, in which like numerals designate like parts. In this case, strips 7 and 9 only are fed into the retort 19 through openings 27 and 29, to form interior reaches 55 and 57, respectively. Reach 57 of strip 9 passes into a curling draw die 115 and is curled into the form of a tube 117. Reach 55 of strip 7 passes over guide roll 101 and enters a curling draw die 119, to be curled around the tube 117 to form a tube 121. Curled tube 117 passes axially through die 119 within the tube 121. The assembly is drawn out of the opening 93 of the retort 19 by the rolls 13', 15' and delivered to the wind-up coiler 17. Compression applied by the rolls 13', 15' is such as to squeeze the tubular form 121 of material 7 on the tubular form 117 of material 9, thus forming a clad tube. Squeezing is accomplished with sufficient compression and reduction that a solid-phase bond is formed between the tubes 117 and 121 and in their abutments 123 and 125, respectively (FIG. 17). In this case again the circuit portions 49 and 51 are connected, to cause heating of the reaches 55 and 57.

In all forms of the invention it may be desirable under some ambient temperatures to heat the rolls such as 13, 15 or 13', 15' by suitable means such as conventional gas burners or the like (not shown), in order to avoid rapid chilling of the materials that pass through them.

Although heating of the strips 7, 9 and wire 11 is illustrated herein as being accomplished by resistance heating, i.e., sending current directly through them, it will be understood that other heating means may be used such as an electric, gas or other heater in or around the retort 19.

It will be apparent that in all forms of the invention, the structures shown may be ganged simultaneously to produce several clad wires, clad tubes or the like. Thus each pair of squeezing rolls might have more than one pair of grooves of the shapes illustrated and more than one group of strip and wire materials passing through the retort means. It will also be understood that more than one cladding layer may be applied to a wire or tube, according to the principles of the invention.

In all forms of the invention, the diameter of the material as bonded may not be exactly that desired. If not, the material may be finished to a smaller diameter by a drawing operation subsequent to bonding. It will also be understood that although circular cross sections are shown, other cross sections may be produced such as, for example, elliptical or polygonal sections and the term "cylinder" as used herein is intended to comprehend all such cross sectional shapes.

Although the inner tubes in the forms of the invention shown in FIGS. 13 and 17 are of the seam type, it will be understood that these may be prefabricated tubes of other types, around which the sheathing is applied and bonded, as described herein.

An advantage of the invention is the continuous operation in one operating assembly including heating means for the wire and strip, the heating means eliminating bond-deterrent films and controlling the characteristics of the wire and strip materials so that solid-phase bonding in the mill rolls can be carried out rapidly and reliably under conditions of minimum reduction.

It will be seen that the electric heating method described herein has the advantage that the various reaches of material passing through the retort 19 may be differentially heated, i.e., brought up to different temperatures as the rolls are reached. This phase of the invention may be generally referred to as differential heating of the reaches of material as they are brought together.

The following table supplies examples of parameters that may be used in carrying out the invention for sheet and core material:

| Sheet and core material and sizes | As bonded Diam. (in.) | Percent Diam. Reductions | Finish Drawn Diam. (in.) | Bonding Temps. | Mode of Heating |
|---|---|---|---|---|---|
| .010″ Ni sheet<br>.174″ Dia. Cu core | .184 | 5 | .100 | Sheet 1,800° F<br>Core 1,400° F | Direct resist. heating. |
| .010″ Cu sheet<br>.175″ Dia. 42 alloy* core | .184 | 5 | .030 | Sheet 1,200° F<br>Core 1,800° F | Do. |
| .030″ Ag sheet<br>.162″ Dia. Ni core | .185 | 16 | .050 | Sheet 1,200° F<br>Core 1,200° F | Electric furnace. |
| .015″ Ag sheet<br>.180″ Dia. Ni core | .185 | 12 | .050 | Sheet 1,200° F<br>Core 1,200° F | Do. |
| .020″ Ni sheet<br>.180″ Dia. Cu core | .185 | 16 | .100 | Sheet 1,400° F<br>Core 1,400° F | Do. |

*42 alloy consists of approximately 42% nickel and the remainder iron.

As an example of the production of tubing without a core wire, direct resistance heating to 1800° F. was used for a nickel sheet .010″ thick formed into an elliptical section measuring .120″ x .185″. In this case the method shown in FIGS. 1–9 was used without a core wire. A tubular elliptical form resulted by reason of buckling of the strips into the roll grooves as bonding occurred at the parallel bond stripes between the roll lands. The reduction at the strip abutment areas and at the seams between roll lands ranged from 0 to 100%. At the 100% reduction a portion such as the waste strips 81 fell away, leaving only small fin areas such as 80 to be removed by the skivers 85, if desired. Sometimes such removal of fins 80 may not be desired, as when tubing is to be employed in a heat-transfer application.

It will be understood that combination of various other metals than those above mentioned may be used such as gold (Au), nickel (Ni), silver (Ag), molybdenum (Mo), steel (Fe), tantalum (Ta), et cetera.

In all of the forms of the invention shown in FIGS. 1, 10, 12 and 16, the cladding occurs around a supporting cylindrical core and the cladding strip therefore may be comparatively thick or thin. In the case of tube formation without a supporting core, as shown for example in FIGS. 14 and 15, the use of very thin strip material 57 may result in irregular tube formation. In order to prevent such irregularity when using thin strip material, a supporting arbor may be required, as shown in FIG. 18. Referring in this respect to FIG. 18, numerals 130 and 150 designate rolls corresponding to rolls 13′ and 15′ in FIG. 14. The remaining parts shown in FIG. 18 which correspond to the remaining parts shown in FIG. 14 have corresponding numbers except that in FIG. 18 they are primed.

In FIG. 18 the strip 57′ is assumed to be so thin as to require support. This is provided by an arbor which is shown at numeral 127. This is supported on a bracket 129 inside of the retort 19′. The arbor 127 extends through the die 109′ and the outlet 93′ of the retort. From here it extends out through the circular space between the rolls 130 and 150. The diameter of the arbor 127 is smaller than the hole through the die 109′ and the circular cross section between rolls 130 and 150 by an amount designed to accommodate the thickness of the material 57′ as it is folded around the arbor by the die 109′. Thus the arbor acts as a support for the material as it is squeezed in passing between the rolls 130 and 150. It will be understood that a similar arbor can be used if a multi-ply tube is being formed requiring internal bracing at the rolls.

Figure 19:
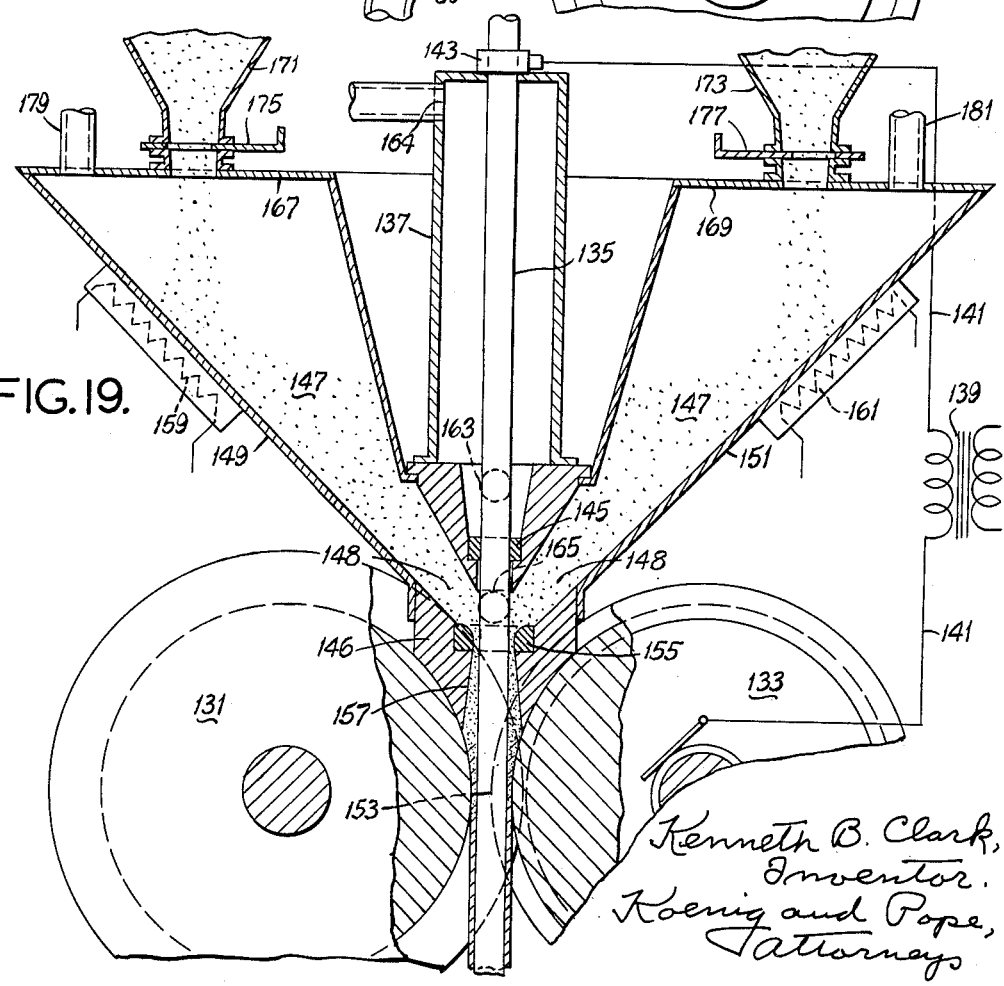
FIG. 19 is a cross section illustrating another form of the invention.

In FIG. 19 is shown a form of the invention in which cladding around core material is accomplished with powdered material and differential heating. There are several advantages of cladding with powders. Many powders are cheaper than the same material in strip form in the size needed to produce the same cladding thickness. Wires with the cladding material which is harder than the core can often be more easily made with powders than the strip cladding material. There is less cladding scrap with powder than with strip used for cladding. There is no fin to be removed with powders. Usually smaller reductions are required to bond powders to solid wrought metals than to bond solid wrought metals to solid wrought metals.

Referring to FIG. 19, the squeezing rolls shown at numerals 131 and 133 are similar to rolls 13′, 15′, above described in connection with FIGS. 10–17, or rolls such as 13, 15 described in connection with FIG. 1. Core material is shown at 135, which may be of rod or tube form. The core 135 passes through a retort 137 carrying an inert or reducing atmosphere in a manner to be described. The core wire 135 is resistance-heated by passing electric current therethrough from a transformer 139 over a circuit 141 and through commutating means 143 to the core 135. The circuit is otherwise closed through roll 133, as will appear. The core 135 is guided between rolls 131 and 133 by a guide ring 145 in a guide block 146. Finely divided material such as powder 147 from hoppers 149 and 151 is fed through openings 148 in block 146 into an orifice piece 155 which spacedly surrounds the core. Thus the powder surrounds the core wires at openings 148 as the core emerges from the guide 145. The powder 147 is propelled partly by gravity and partly by the moving core 135 to flow downward along with the core through the orifice piece 155 and a flaring nozzle portion 157 of the block 146. Thus metering of the powder 147 is effected by the orifice piece 155 and the flare 157 assures a homogeneous distribution of the powder around the core. Various interchangeable orifices pieces may be supplied for changing the metering rate.

From the nozzle 157 the powder which surrounds the downwardly moving core 135 proceeds therewith to the pinch point 153 between the rolls 131 and 133. This pinch point is closely adjacent to the outlet of the flare 157. Cladding thickness can be varied by changing the proportions of the cross seection of the orifice, the core cross section and the roll opening area. Powder size, shape and density will also effect the cladding thickness, as well as roll diameter, roll surface finish, roll speed and material temperatures. The temperature of the core 135 is controlled from the circuit 141. The temperature of the powder 147 can be controlled by means of heaters 159, 161, which are in heat-exchange relation with the hoppers 149 and 151.

A reducing or inert atmosphere is introduced into the retort 137 through an opening 163, escaping at port 164. A reducing or inert atmosphere is also introduced into the powder hoppers 149 and 151 through an opening 165 communicating with openings 148. The hoppers 149 and 151 are enclosed with covers 167 and 169, respectively, and are filled with powder through control gates 175 and 177 of the filling hoppers 171 and 173, respectively. Powder in the hoppers serves as a trap to prevent the escape or contamination of the atmosphere in the hoppers. The reducing atmosphere introduced into the hoppers 149, 151 escapes outward through pipes 179 and 181.

The powder is caused to trickle from the hoppers 171 and 173 at a fast enough rate to replenish the supply. Much of the entrapped air contained by the loose powder will mix with the inert or reducing atmosphere in the hoppers and flow out of the hoppers through the exit tubes 179, 181. Thus the powder settles down into the hoppers and most of the gases that were entrapped therewith upon entry become replaced by the inert or reduced atmosphere. Heating of the powder by means of the heaters 159, 161 serves to aid removal of air from the entering powder and also any water vapor contained therein. The water vapor along with the air thus removed will flow out of the pipes 179, 181. The use of resistance heating in core 135 and powder heating by the heaters 159 and 161 provides for controlled differential heating.

The powder may be composed, for example, of copper, nickel, tungsten, etc., or a nonmetal such as carbon, glass, silicon carbide, et cetera. It will be noted that in such event the heating circuit 141 for core 135 is completed through the members 146 and 145, both of which are current-conductive. The core may be a solid or hollow cylinder of copper, nickel, tungsten, etc., or a nonmetal such as carbon, glass, silicon carbide, et cetera. When a nonconductor such as glass, for example, is used for the core material, direct resistance heating such as illustrated in FIG. 19 cannot be used. In such event, a retort may be used such as described in connection with FIGS. 1, 10, 12, 14 and 16, except that heating will be carried out by means other than resistance heating, as by external heating, for example.

The rolls 131 and 133 compact the powder around the core 135 and at the same time bond the powder cladding to the core material. The cladding material is heated to a temperature at which sintering between its particles and pressure bonding therebetween and to the core 135 will occur under squeezing action of the rolls 131, 133. The core reduction effected by the roll pressures as the powdered material is squeezed into place may be as low as 1% to 10% on the core diameter.

Respecting all forms of the invention, it will be understood that heating results in removing bond-deterrent material from metal surfaces. It is assumed that prior to heating the materials will have had gross contaminants removed therefrom.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

The method of manufacturing continuous clad cylindrical material comprising simultaneously continuously moving a metal core and two metal strips, from which bond-preventing contaminants have been removed, through a protective atmosphere to roll squeezing means the strips and the core being composed of different metals in dissimilar conditions, maintaining said atmosphere around the core and strips up to contact with the squeezing means, heating the strips on the one hand and the core material on the other hand to produce a difference in temperatures in their solid states as they move through said atmosphere and up to the squeezing means, whereby their properties are independently controlled to maintain optimum conditions for solid-phase bonding, then while the strips and core material are heated continuously, transversely bending the strips on opposite sides of the core and squeezing them in their bent forms and solid state, with a sufficient applied pressure and reduction in the strips and in the core material effected by said squeezing means while the strips and core material are in said atmosphere to solid-phase bonding the strips to the core and to solid-phase bond adjacent margins of the strips to one another on opposite sides of the core, and thereafter sintering the solid-phase bonded clad material to improve all of the bonds between the strips and between them and the core.

References Cited by the Examiner
UNITED STATES PATENTS

| | | | |
|---|---|---|---|
| 246,407 | 8/1881 | McTighe | 29—470.1 |
| 1,944,073 | 1/1934 | Fogg et al. | 29—477.7 |
| 2,234,127 | 3/1941 | Mautsch | 29—420 X |
| 2,341,732 | 2/1944 | Marvin. | |
| 2,691,815 | 10/1954 | Boessenkool et al. | |
| 2,746,141 | 5/1956 | Hobrock | 29—497.5 X |
| 2,800,561 | 7/1957 | Shenk | 219—72 X |
| 2,821,772 | 2/1958 | Billetter | 29—470.1 X |
| 2,947,078 | 8/1960 | Pflumm et al. | 29—497.5 X |
| 2,975,087 | 3/1961 | Donald | 29—477.7 |
| 3,095,500 | 6/1963 | Jost | 219—117 |

FOREIGN PATENTS

| | | |
|---|---|---|
| 521,963 | 4/1931 | Germany. |
| 304,736 | 4/1930 | Great Britain. |

JOHN F. CAMPBELL, *Primary Examiner.*

WHITMORE A. WILTZ, *Examiner.*